US005828062A

United States Patent [19]

[11] Patent Number: 5,828,062

[45] Date of Patent: Oct. 27, 1998

Jarrell et al.

[54] IONIZATION ELECTROSPRAY APPARATUS FOR MASS SPECTROMETRY

[75] Inventors: Joseph A. Jarrell, Newton Highlands, Mass.; Michael J. Tomany, Thompson, Conn.

[73] Assignee: Waters Investments Limited, New Castle, Del.

[21] Appl. No.: 807,993

[22] Filed: Mar. 3, 1997

[51] Int. Cl.[6] .............................. B01D 59/44; H01J 49/00

[52] U.S. Cl. .............................................. 250/288; 250/282

[58] Field of Search ...................................... 250/281, 282, 250/288

[56] References Cited

U.S. PATENT DOCUMENTS

| | | | |
|---|---|---|---|
| 4,023,398 | 5/1977 | French et al. | 73/23 |
| 4,160,161 | 7/1979 | Horton | 250/281 |
| 4,209,696 | 6/1980 | Fite | 250/281 |
| 4,531,056 | 7/1985 | Labowsky et al. | 250/288 |
| 4,842,701 | 6/1989 | Smith et al. | 204/180 |
| 4,861,988 | 8/1989 | Henion et al. | 290/288 |
| 4,935,624 | 6/1990 | Henion et al. | 250/288 |
| 4,977,785 | 12/1990 | Willoughby et al. | 73/863.12 |
| 5,015,845 | 5/1991 | Allen et al. | 250/288 |
| 5,115,131 | 5/1992 | Jorgenson et al. | 250/288 |
| 5,306,412 | 4/1994 | Whitehouse et al. | 204/299 |
| 5,581,081 | 12/1996 | Kato et al. | 250/288 |

FOREIGN PATENT DOCUMENTS

| | | |
|---|---|---|
| 1246709 | 9/1971 | United Kingdom . |

OTHER PUBLICATIONS

Sunner, et al., *Factors Determining Relative Sensitivity Of Analytes In Positive Mode Atmospheric Pressure Ionization Mass Spectrometry,* American Chemical Society, vol. 60, pp. 1300–1307, 1988.

Henion, et al., *Determination Of Sulfa Drugs In Biological Fluids By Liquid Chromatography/Mass Spectrometry/Mass Spectrometry,* American Chemical Society, vol. 54, pp. 451–456, 1982.

Smith, et al., *Improved Ionization Inerface For Capillary Zone Electrophoresis–Mass Spectrometry,* Chemical Methods And Separations Group, Anal. Chem. vol. 60, pp. 1948–1952, 1988.

Mann, *Electro Spray: Its Potential And Limitations As An Ionization Method For Biomolecules,* Organic Mass. Spectrometry, vol. 25, pp. 575–587, 1990.

*Primary Examiner*—Bruce Anderson
*Attorney, Agent, or Firm*—Brian L. Michaelis; Anthony J. Janiuk

[57] ABSTRACT

An electrospray (ES) apparatus provides efficient reagent addition and improved ionization of an analyte aerosol at high flow rates by combining an ionized reagent aerosol with the analyte aerosol, thereby producing a superior ionized analyte aerosol for mass spectronomy (MS) implementations. The ES apparatus separately receives a reagent and a flow stream comprising analyte. The ES apparatus nebulizes the reagent and flow stream into aerosols, ionizes the reagent aerosol, combines the aerosols into an ionized analyte aerosol, and outputs the ionized analyte aerosol towards a mass spectrometer. The ionized analyte aerosol is formed at high flow rates and with effective reagent mixing, thereby minimizing flow stream aberrations and substantially improving signal sensitivity and selectivity in the mass spectrometer. Contact, mixing, and charge transfer between analyte and reagent particles is positively impacted in an aerosol format, thereby improving reagent mixing efficiency and producing a suitably ionized analyte aerosol at high flow rate. A plurality of nebulizers are used to provide the analyte and ionized reagent aerosols at high flow rate.

7 Claims, 1 Drawing Sheet

IONIZATION ELECTROSPRAY APPARATUS FOR MASS SPECTROMETRY

FIELD OF INVENTION

The present invention relates to a method and apparatus for producing ions suitable for analysis in a mass spectrometer, and more particularly to electrospray ionization techniques for producing an ionized analyte aerosol and outputting the aerosol towards a mass spectrometer.

BACKGROUND

Liquid chromatography/mass spectrometry (LC/MS) is a useful analytical technique for determining the molecular weight and chemical structure of an analyte dissolved in a flow stream such as a liquid or supercritical fluid. Generally, analysis is done by separating the flow stream into component analytes, forming an ionized analyte aerosol, and outputting the ionized analyte aerosol toward a mass analysis implementation such as a mass spectrometer.

Various chromatographic techniques are used to form flow streams for output to a mass spectrometer, including, liquid chromatography (LC), supercritical fluid chromatography (SFC), high performance liquid chromatography (HPLC), capillary zone electrophoresis (CZE), isotachophoresis and electrokinetic chromatography (Mann, M., *Organic Mass Spec*. 25:575 (1990); Smith, R. D. et al. *Anal. Chem*. 60:1948 (1988)).

Generally, the chromatographic techniques include passage of the flow stream at elevated pressure through a chromatographic column. The column is configured to separate the flow stream into component analytes separated in time and space as distinct bands. For example, LC/MS provides one system for separating the flow stream into component analytes for output to the mass spectrometer.

Several techniques have been developed for converting the flow stream into the ionized analyte aerosol. For example, in electrospray ionization (ES) a nebulizer receives the flow stream and outputs it through a restricted port to form an analyte aerosol (see generally U.S. Pat. Nos. 5,304,798 to Tomany et al. and references cited therein). For example, the nebulizer can be a restrictor nozzle or a heated capillary tube (Jarrell et al. supra, and references cited therein). The nebulizer typically subjects the analyte aerosol to an electrical charge to form the ionized analyte aerosol for output towards the mass spectrometer ( Mann, M., supra; Smith, R. D. et al. supra, U.S. Pat. Nos. 4,209,696 to Fite, 4,160,161 to Horton, 5,115,131 to Jorgenson and Dohmeicer, and 4,531,056 to Labowsky et al.). Atmospheric pressure ionization (API) is another technique for producing ionized analyte aerosols suitable for MS (see Sunner, J. et al. *Anal. Chem*. 60:1300 (1988); Henion, J. D. et al. *Anal. Chem*. 54 451 (1982)).

However, use of the prior techniques has resulted in problems. For example, many ES techniques generally use a nebulizer with an optimal flow rate of less than about 50 $\mu$l/min. At this low flow rate, analysis of large column volumes is difficult, time consuming and labor intensive. Prior attempts to increase the flow rate have included thermal-assisted and pneumatic-assisted ES methods (see e.g., U.S. Pat. Nos. 4,935,624 and 4,861,988 to Henion et al.). However these methods often negatively impact high flow rate by providing unsatisfactory ionization and large particle formation. For some flow streams, an increase in nebulizer electrical charge can assist analyte ionization and dispersal, however risk of an electrical discharge also increases. These deficiencies limit efficient flow stream analysis and contribute to substantial decreases in signal sensitivity and selectivity in the mass spectrometer. Further, the ability to achieve suitably charged ions is often limited in API.

More particularly, thermal-assisted electrospray methods are not always suitable for mass analysis of heat-sensitive analytes such as bio-organic molecules (Fenn, J. B. et al. *Science* 246:64 (1989); Fenn et al. *Mass. Spectrom. Rev*. 9:37 (1990); Grace, J. M. and Marijnissen, J. C. M. *J. Aerosol Sci*., 25:1005 (1994); and references cited therein).

Another limitation of prior ES devices is the difficulty of efficiently adding reagent to the flow stream after it exits the chromatographic column. In some cases it can be useful to add reagent to the flow stream, e.g., to increase or maintain analyte solubility or to improve aerosol formation. Particularly, it can be useful to modify the fraction of water in the flow system to improve aerosol formation and minimize formation of large droplets. However with prior ES devices, adding reagent to the flow stream often causes incomplete mixing and/or analyte precipitation, flow stream aberrations, and decreased signal sensitivity in the mass spectrometer.

SUMMARY OF THE INVENTION

The present invention features an ES apparatus that provides efficient reagent addition and improved ionization of an analyte aerosol at high flow rates by combining an ionized reagent aerosol with the analyte aerosol, thereby producing a superior ionized analyte aerosol for MS implementations.

According to the invention an ES apparatus separately receives a reagent and a flow stream comprising analyte. The ES apparatus nebulizes the reagent and flow stream into aerosols, ionizes the reagent aerosol, combines the aerosols into an ionized analyte aerosol, and outputs the ionized analyte aerosol towards a mass spectrometer. The ionized analyte aerosol is formed at high flow rates and with effective reagent mixing, thereby minimizing flow stream aberrations and substantially improving signal sensitivity and selectivity in the mass spectrometer.

The ES apparatus of the invention achieves these objectives by combining an ionized reagent aerosol and an analyte aerosol to produce the ionized analyte aerosol. Contact, mixing, and charge transfer between analyte and reagent particles is positively impacted in an aerosol format, thereby improving reagent mixing efficiency and producing a suitably ionized analyte aerosol at high flow rate. The ES apparatus uses a plurality of nebulizers to permit the formation of analyte aerosols at high flow rate. The analyte aerosol, ionized reagent aerosol and/or the ionized analyte aerosol can be combined with additional reagent in a gas or aerosol format to optimize output of the ionized analyte aerosol towards the mass spectrometer.

BRIEF DESCRIPTION OF THE DRAWINGS

Still other features, advantages and aspects of the present invention will become apparent from a description of illustrative embodiments hereinafter, when read in conjunction with the drawings of which.

DETAILED DESCRIPTION

Figure 1:
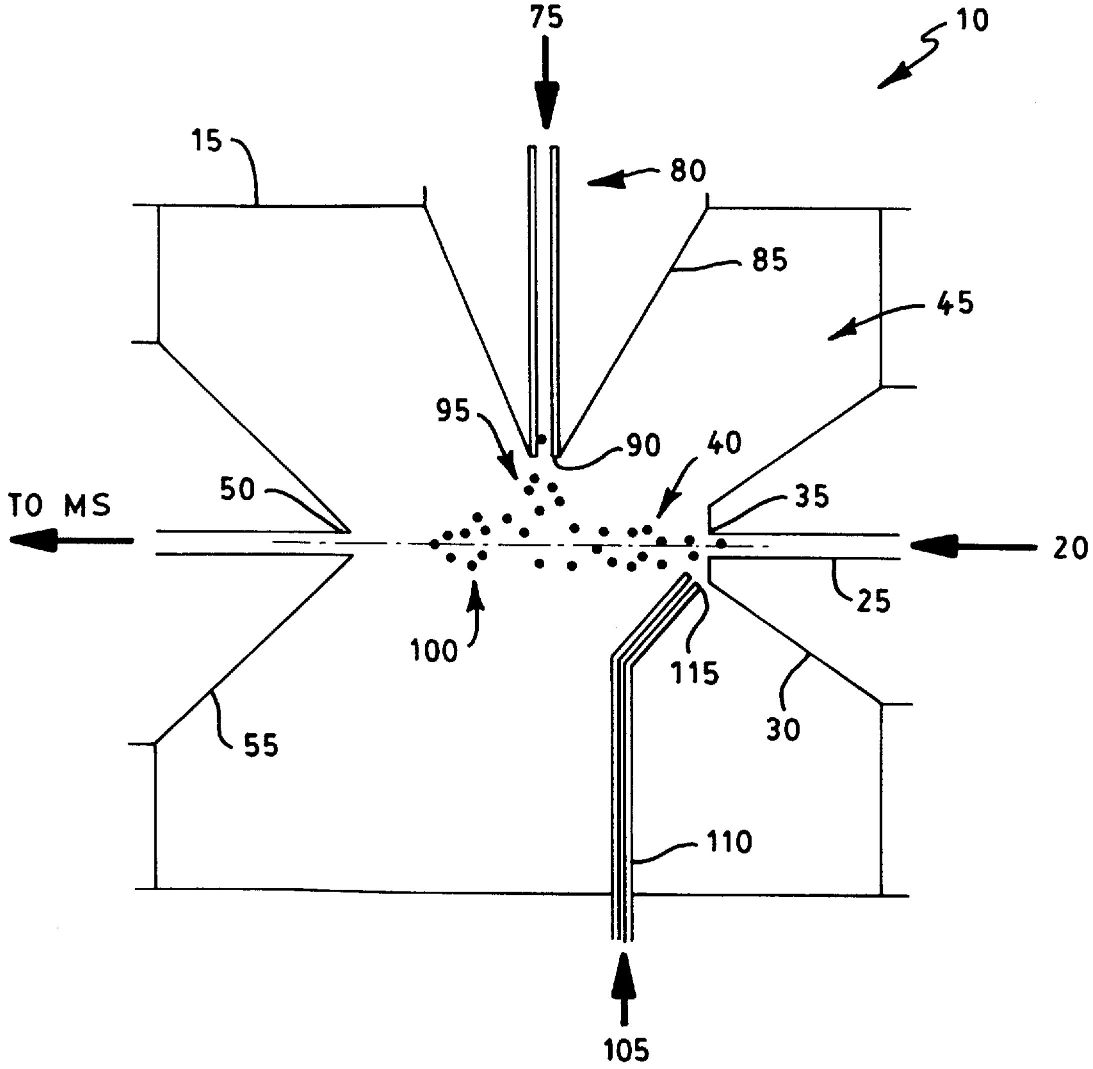
FIG. 1 is a schematic drawing showing one embodiment of an ES apparatus according to he invention

An ES apparatus in accordance with the present invention separately receives a flow stream and a reagent aerosol, produces an analyte aerosol which can be at a high flow rate and an ionized reagent aerosol, and combines the aerosols to produce the ionized analyte aerosol, thereby providing efficient reagent mixing at high flow rate and forming an ionized analyte aerosol suitable for output towards a mass spectrometer. In one embodiment of the present invention, the ES apparatus is interfaced with a reagent supply and a chromatographic implementation such as an LC unit. The LC unit outputs the flow stream at high flow rate through a first nebulizer and into an ES region as an analyte aerosol. The reagent supply controllably outputs a reagent flow stream into the ES apparatus as a liquid, gas, liquid mixture, or gas mixture e.g., a post-column additive or desolvating gas. A liquid reagent flow stream is generally outputted as a charged spray, typically an electrospray, through a second nebulizer to form a reagent aerosol in the ES apparatus. Typically, the reagent aerosol is ionized by an electrical charge from a voltage implementation, including applying voltage from the voltage implementation to the second nebulizer. Additionally, the ionized analyte aerosol can be optimized for output towards a mass spectrometer by combining the ionized analyte aerosol, ionized reagent aerosol, and/or analyte aerosol with additional reagent in an aerosol, ionized aerosol or gas format.

The ES apparatus of the present invention can be used to produce an ionized analyte aerosol from a compound or mixture of compounds of medicinal, forensic or commercial interest including, e.g., small ions, proteins, polypeptides, peptides, nucleic acids, oligosaccharides, sugars, fats, lipids, lipoproteins, glycoproteins, synthetic polymers, metalloproteins, organometallic compositions, toxins (e.g., pesticides and carcinogens), drugs and pharmaceuticals.

One embodiment of the present invention is illustrated in FIG. 1. The ES apparatus 10 is suitable for accepting a flow stream 20 at high flow rate from a chromatographic implementation such as LC chromatograph. Generally, the high flow rate will be between approximately 50 to 5000 $\mu$l/min, preferably between approximately 500 to 2000 $\mu$l/min. The flow stream composition will vary from essentially pure water to essentially pure organic solvent such as methanol, and may contain additives such as organic acids (e.g., formic acid) or inorganic buffers. Other potential flow stream components include benzene, acetone, ethyl ether, ethanol, butyl alcohol, acetonitrile; a straight chain hydrocarbon such as n-hexane, or suitable mixtures thereof.

The flow stream 20 is conducted through a length of non-conductive or conductive tubing 25 (e.g., stainless steel or fused silica) to a first nebulizer 30 with an exit port 35. Generally, the first nebulizer 30 will be a conventional nebulizer such as an ultrasonic nebulizer known in the art. Exemplary of such nebulizers include those with an aperture diameter of approximately $10^{-5}$ to $10^{-1}$ cm, suitable for droplets approximately $10^{-5}$ to $10^{-2}$ cm in diameter. Preferably, the nebulizer 30 will be capable of accepting a flow rate of between approximately 1 to 1000 $\mu$l/min. The nebulizer 30 outputs an analyte aerosol 40 into an ES region 45 through the exit port 35 and toward an aperture 50 substantially aligned with the exit port 35 of the first nebulizer 30. For some applications, it may be desirable to apply a slight electrical potential on the order of approximately 10 to 300 volts to the first dispersive nebulizer 30 to augment dispersal of the analyte aerosol 40.

A first pressurized reagent flow stream 75 is conducted through a second length of non-conductive or conductive capillary tubing 80 to a second nebulizer 85 with an exit port 90. The second nebulizer 85 is a conventional nebulizer capable of producing a charged spray, and with an aperture diameter of approximately $10^{-5}$ to $10^{-2}$ cm suitable for droplets approximately $10^{-5}$to $10^{-3}$ cm in diameter. In this illustrative embodiment, nebulizer 85 is capable of accepting a flow rate of between approximately 0.1 to 100 $\mu$l/min. In most cases, the flow rate of the nebulizer 30 will be approximately five times greater than the flow rate of the nebulizer 85. The second nebulizer 85 is biased with a charge of approximately 1 to 10 kilovolts, in this embodiment preferably approximately 3 to 6 kilovolts, to disperse and ionize the reagent flow stream 75 to form an ionized reagent aerosol 95 in the ES region 45. The exit port 90 of the nebulizer 85 is disposed between the sampling cone 55 and the nebulizer 30 sufficient to intersect reagent aerosol 95 and the analyte aerosol 40. Contact, mixture, and charge transfer between the analyte aerosol 40 and the ionized reagent aerosol 95 forms an ionized analyte aerosol 100 for output towards the sampling cone 55 and the mass spectrometer.

For some applications, it is useful to add additional reagent to the analyte aerosol 40, the ionized reagent aerosol 95, and/or the ionized analyte aerosol 100 in the form of a post-column liquid additive or a desolvating gas. In such cases, a second pressurized reagent flow stream 105 is inputted through a conduit 110 having an exit port 115 for the second reagent flow stream 105 to flow toward the analyte aerosol 40. In the embodiment shown in FIG. 1, the conduit 110 is disposed nearly adjacent to the exit port 35 of the nebulizer 30 sufficient to intersect and combine with the analyte aerosol 40. The conduit 110 can be a conventional open-ended capillary tube suitable for an electrospray implementation, including an electrospray needle.

Additionally, the exit port 115 of the conduit 110 is disposed within the ES region housing 15 in a location sufficient to intersect and combine with the ionized reagent aerosol 95 or the ionized reagent aerosol 100. The conduit 110 can be configured to output reagent as a liquid or liquid mixture aerosol, in which case the conduit 110 will typically be a nebulizer such as those mentioned hereinbefore. Alternatively, the conduit 110 can be designed to output a gas or mixture of gases.

In addition to the ES apparatus 10 described hereinbefore, other ES apparatus configurations are within the scope of the present invention. For example, a plurality of nebulizers can be suitably employed in the ES region 45 to provide additional reagent. Further, a conductive grid can be added within the ES region 45 to provide charge to the analyte aerosol 100, particularly in applications where the analyte aerosol 100 is at ground or where use of a voltage pulse is desired. Exemplary of such conductive grids are these disclosed in U.S. Pat. Nos. 5,306,910 and 5,436,446.

The present invention is thus useful to detect and determine the molecular weight and structure of one or more analytes present in the flow stream even though the analyte may be present in very small amounts. The mass spectrometer or analyzer can be of several types such as a quadruple, mass magnetic mass, TOF (time of flight), fourier transform or other suitable type of mass analyzer, although a quadruple mass analyzer is often preferred for use with many chromatographic implementations including liquid chromatography.

Although the invention has been shown and described with respect to an exemplary embodiment thereof, it will be appreciated from the foregoing that various other changes, omissions and additions in the form and detail thereof may be made therein without departing from the spirit and scope of the invention.

What is claimed is:

1. An apparatus for converting a flow stream comprising analyte into an ionized analyte aerosol to output the aerosol toward a mass spectrometer, the apparatus comprising:

an electrospray region receiving the flow stream at high flow rate and outputting the ionized analyte aerosol, the electrospray region comprising:

a first nebulizer terminating in the electrospray region passing the flow stream therethrough as an analyte aerosol, a second nebulizer terminating in the electrospray region passing a first reagent flow stream therethrough as an ionized reagent aerosol, and an aperture positioned at an end of the electrospray region, the aperture being substantially aligned with an exit port of the first nebulizer; wherein the ionized reagent aerosol contacts the analyte aerosol to form the ionized analyte aerosol for output toward the mass spectrometer.

2. The apparatus according to claim 1, further comprising a plurality of nebulizers disposed between the first nebulizer and the aperture.

3. The apparatus of claim 2, wherein a voltage is applied to a surface positioned between the aperture and one of the plurality of nebulizers and disposed proximate to the aperture, the surface being spaced apart from the one of the plurality of nebulizers.

4. The apparatus of claim 1, wherein a voltage is applied to the second nebulizer.

5. The apparatus of claim 1 further comprising at least one conduit for providing a second reagent along the first axis.

6. A method of converting a flow stream comprising analyte into an ionized analyte aerosol at high flow rate and outputting the analyte aerosol towards a mass spectrometer, the method comprising the steps of:

passing the flow stream through a first nebulizer to produce an analyte aerosol;

passing a first reagent flow stream through a second nebulizer to produce a reagent aerosol;

ionizing the reagent aerosol to produce an ionized reagent aerosol;

contacting the ionized reagent aerosol with the analyte aerosol to produce an ionized analyte aerosol; and outputting the ionized analyte aerosol towards the mass spectrometer.

7. The method of claim 6 further comprising adding a second reagent in an aerosol, ionized aerosol or gas format.

* * * * *